US007280666B2

(12) United States Patent
Guyot et al.

(10) Patent No.: US 7,280,666 B2
(45) Date of Patent: Oct. 9, 2007

(54) MOVEABLE DEVICE COMPONENT WITH ACOUSTIC PORTING

(76) Inventors: Nicolas E. Guyot, 1816 SW. 4th Ave., Pompano Beach, FL (US) 33060; Joseph M. Friedman, 10871 NW. 12th Pl., Plantation, FL (US) 33322

(*) Notice: Subject to any disclaimer, the term of this patent is extended or adjusted under 35 U.S.C. 154(b) by 336 days.

(21) Appl. No.: 10/973,231

(22) Filed: Oct. 26, 2004

(65) Prior Publication Data

US 2006/0088179 A1 Apr. 27, 2006

(51) Int. Cl.
*H04M 1/00* (2006.01)
*H04R 1/02* (2006.01)

(52) U.S. Cl. .................. 381/351; 455/569.1; 381/345; 379/433.02

(58) Field of Classification Search ............. 455/575.3, 455/575.1, 569.1; 381/337, 344, 345, 351, 381/361, 386; 379/430, 433.02, 433.03, 379/432, 388.02, 420.01-420.04, 433.01; 181/177, 178, 179, 182

See application file for complete search history.

(56) References Cited

U.S. PATENT DOCUMENTS 5,732,331 A * 3/1998 Harms ..................... 455/575.3
6,134,336 A * 10/2000 Clark ......................... 381/371
7,092,745 B1 * 8/2006 D'Souza .................. 455/575.1
7,103,395 B2 * 9/2006 Mori ....................... 455/575.1
2001/0029198 A1 * 10/2001 Miyashita et al. .......... 455/575
2004/0018862 A1 * 1/2004 Godston et al. ......... 455/575.3
2005/0020327 A1 * 1/2005 Chung et al. ............ 455/575.3
2005/0137000 A1 * 6/2005 Toh et al. ................ 455/575.4
2006/0148540 A1 * 7/2006 Satoh et al. ............. 455/575.3

* cited by examiner

*Primary Examiner*—Sinh Tran
*Assistant Examiner*—Stephen C Hung

(57) ABSTRACT

An acoustic porting arrangement is provided that uses sound pressure signal ports (202, 112) to enhance speaker (406) and microphone cartridge (402) performance when mounting the speaker (406) on a moveable component, such as a flip part (102) of a flip-type cellular phone (100). A speaker acoustic path (504) is incorporated into the moveable component (102) to enhance the acoustic performance of an acoustic transducer (406). A microphone acoustic pathway (502) is also created through the moveable component (102) that delivers sound pressure energy to a microphone (402) that is mounted on a base (104) when the moveable component (102) is in its closed position and covering the microphone (108). Some embodiments reuse a surface acoustic port (202) for both paths.

17 Claims, 6 Drawing Sheets

300

MOVEABLE DEVICE COMPONENT WITH ACOUSTIC PORTING

FIELD OF THE INVENTION

The present invention generally relates to the field of acoustic systems, and more particularly relates to acoustic systems with acoustic pathways through device components.

BACKGROUND OF THE INVENTION

As the trend towards smaller acoustic devices, e.g., telecommunication products, continues, engineers are experiencing increased challenges in designing these smaller and smaller devices while maintaining acceptable acoustic performance. An example is the well known "flip phone" which can be used as a conventional cellular phone or in a high audio mode that includes both speaker phone operations as well as walkie-talkie modes (also known as dispatch modes). When operating in a high audio mode, the flip part of the phone is able to be closed and then physically blocks the microphone mounted in the base of the phone. It is desirable for such a flip phone to have the same microphone acoustic performance regardless of the position of the flip part of the phone. Stated differently, the high audio operation of such a flip phone should not appreciably vary when the flip part is open or closed. Some conventional designs provide an acoustic pathway in the form of a large gap or a groove between the flip part and the base of the phone that acts as an acoustic channel for the audio signal. An acoustic pathway can also be provided between the two parts of the closed flip phone by placing bumpers in the area between the two flip phone parts so that an air gap is provided when the flip phone is closed. Providing these gaps or groves enhances acoustic performance by preventing blockage of the microphone when the flip is closed. These gaps provided by bumpers, however, add thickness to the phone when it is in the closed position, which limits a designer's ability to produce the ever smaller, and especially thinner, acoustic devices such as flip cellular phones that are in demand. The use of bumpers can also increase the number of parts in the phone assembly. Furthermore, these bumpers and groves can cosmetically detract from the phone.

Therefore a need exists to overcome the problems with the prior art as discussed above.

SUMMARY OF THE INVENTION

Briefly, in accordance with the present invention, an acoustic system includes a first component having a microphone and a second component that is moveable relative to the first component. The second component is also able to be positioned in at least a first position and a second position relative to the first component. The second component also has a first wall and a second wall with the second wall being opposite the first wall. The acoustic system further has at least one acoustic transducer that is affixed to the second component. The second component also includes at least one acoustic port that is configured to pass a sound pressure signal, which is generated by the acoustic transducer, through a first wall of the second component. The second component further has at least one dual purpose acoustic port that is located on the second wall of the second component and that is configured to pass an ambient sound pressure signal that enters the at least one acoustic port to the microphone.

Further in accordance with the present invention, a method for coupling a sound pressure signal includes providing a first component that has a microphone and providing a second component. The first component and the second component are movable with respect to each other into at least a first position and a second position. The method further includes providing an acoustic transducer mounted on the second component. The acoustic transducer is capable of producing a sound pressure signal. The method also includes providing at least one acoustic port that is configured to pass the sound pressure signal through a first wall of the second component. The method also includes passing an ambient sound pressure signal that enters the at least one acoustic port through at least one dual purpose acoustic port on a second wall of the second component to the microphone.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
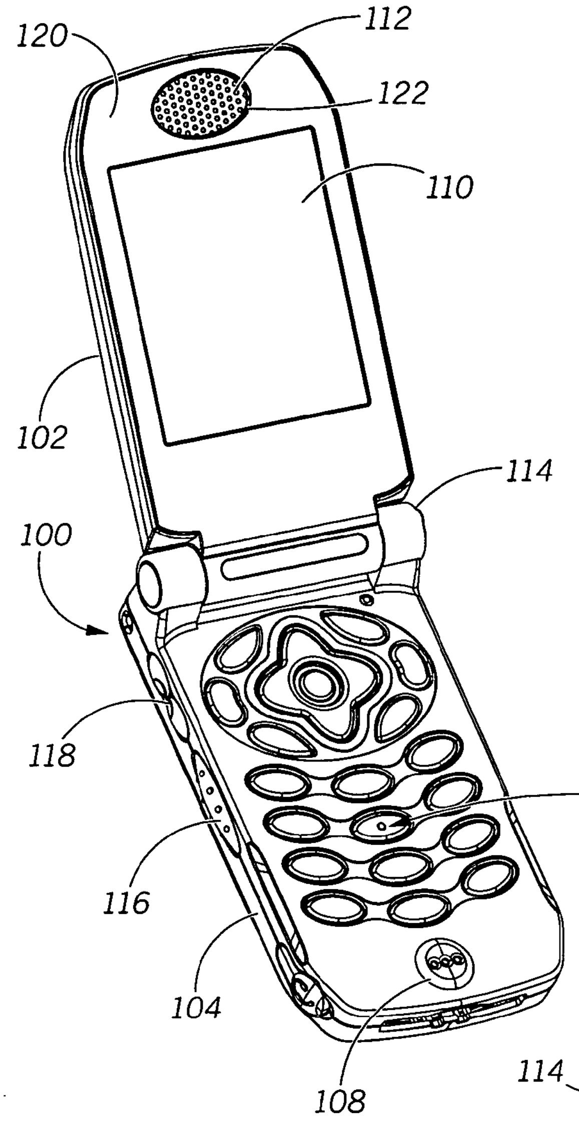
FIG. 1 illustrates a cellular flip-type phone according to an exemplary embodiment of the present invention in an open position.

FIG. 1 illustrates a cellular flip-type phone 100 according to an exemplary embodiment of the present invention in an open position. The cellular flip-type phone 100 includes a first component that is a phone base 104, and a second component that is a flip part 102. The flip part 102 is a cover part in this exemplary embodiment. The phone base 104 and the flip part 102 are moveable relative to each other around a hinge 114. Further embodiments of the present invention incorporate two or more components that move relative to each other in various ways, such as a so-called "slider" phone where a first component is a base part and a second component is a cover part that slides along the first component to expand and contract the size of the phone and expose and conceal various elements of the phone.

The phone base 104 and flip part 102 in this exemplary embodiment include electronic circuits, as are described below, that support wireless voice communications. The phone base 104 of this exemplary embodiment includes a keypad 106 to allow entry of phone numbers and other phone control information for the phone. The phone base 104 of this exemplary embodiment further includes a microphone contained within a microphone protrusion 108 that protrudes above the neighboring surface of the phone base 104, as is discussed in more detail below.

The flip part 102 is connected to the phone base 104 by hinge 114. The flip part 102 is shown in this illustration in the open, or second, position. A closed position, or first position, is illustrated and described below. A flip front side 120 is illustrated in this view of the cellular flip-type phone 100. The flip part 102 has a display 110 that in this exemplary embodiment is able to display alpha-numeric and graphical data that is either communicated over a wireless link or that is used to control the operation of the exemplary cellular phone 100.

The flip part 102 further includes a dual purpose acoustic port 112 that is recessed into the flip front side 120 and that has a recess wall 122. An acoustic transducer, described below, is located behind the dual purpose acoustic port 112 and generates sound pressure signals that correspond to, for example, audio signals received by the cellular phone 100 over a wireless link. The configuration of the dual purpose acoustic port 112 and microphone protrusion 108 allow the open cellular flip-type phone 100 to be held along the face of the user to facilitate wireless audio communications. When the flip part 102 is in its closed position, as is described in further detail below, the recess of the dual purpose acoustic port 112 accepts the protruding microphone protrusion 108. Further embodiments of the present invention incorporate dual purpose acoustic ports that protrude above the flip front side 120 and have microphones that are recessed into the phone base 104. Yet further embodiments of the present invention include microphones that form substantially closed acoustic pathways with other structures between their first component and second components.

Figure 4:
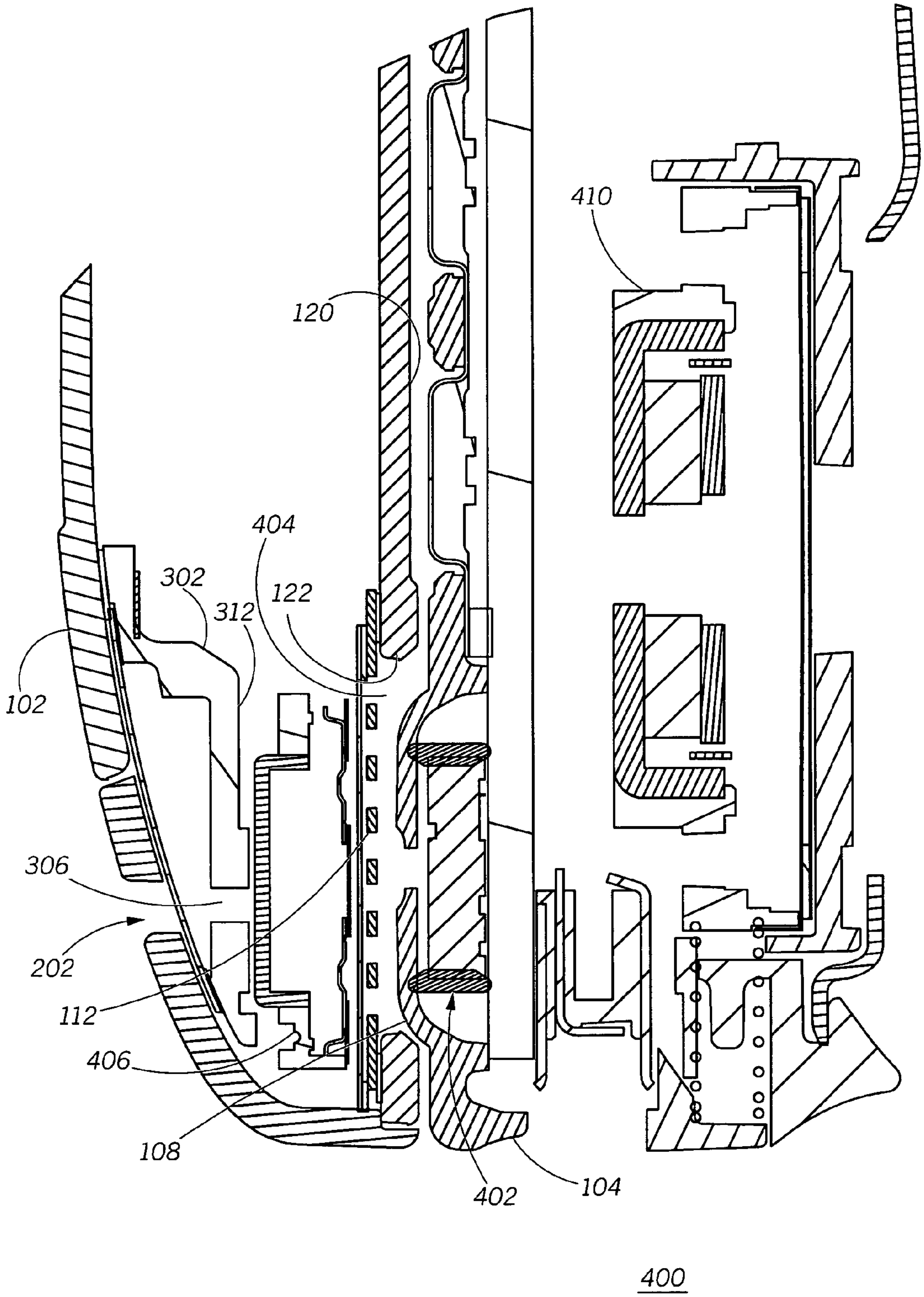
FIG. 4 illustrates a side cut away view for the closed cellular phone of FIG. 2.

The open cellular flip-type phone 100 is able to be used in a mode in which a relatively low level acoustic signal is produced through the dual purpose acoustic port 112 that allows the dual purpose acoustic port 112 to be held near the user's ear. A further operation mode for the open cellular flip-type phone 100 includes a high level audio mode in which a separate speaker, illustrated below in FIG. 4, is used to produce a higher level audio output signal. The cellular phone 100 is then able to be held away from the user's ear and face and used in either of the familiar "speakerphone" or simplex voice communications modes. Microphone within microphone protrusion 108 is also generally operated with increased sensitivity in these modes in order to facilitate operation of the cellular phone 100 in the high level audio mode. Operation in the high level audio mode can be used when the cellular phone is communicating in a speakerphone wherein voice signals are simultaneously transmitted and received over a wireless link, or in a simplex mode wherein the operator alternately selects one of transmitting and receiving voice signals over the wireless link. Simplex mode is controlled in the exemplary cellular phone 100 by pressing the Push-To-Talk (PTT) button 116. When the PTT button 116 is pressed, acoustic signals that are detected by microphone within microphone protrusion 108 are transmitted over the wireless link and no audio signals are received. When the PTT button 116 is released, audio signals received over the wireless link are produced through a high audio level speaker (illustrated below in FIG. 4 and located on the underside of phone base 104 in this exemplary embodiment) so that they can be heard by the user. The volume of the audio signal produced by the cellular phone 100, either through the dual purpose acoustic port 112 or speaker, can be adjusted by volume control buttons 118.

Figure 2:
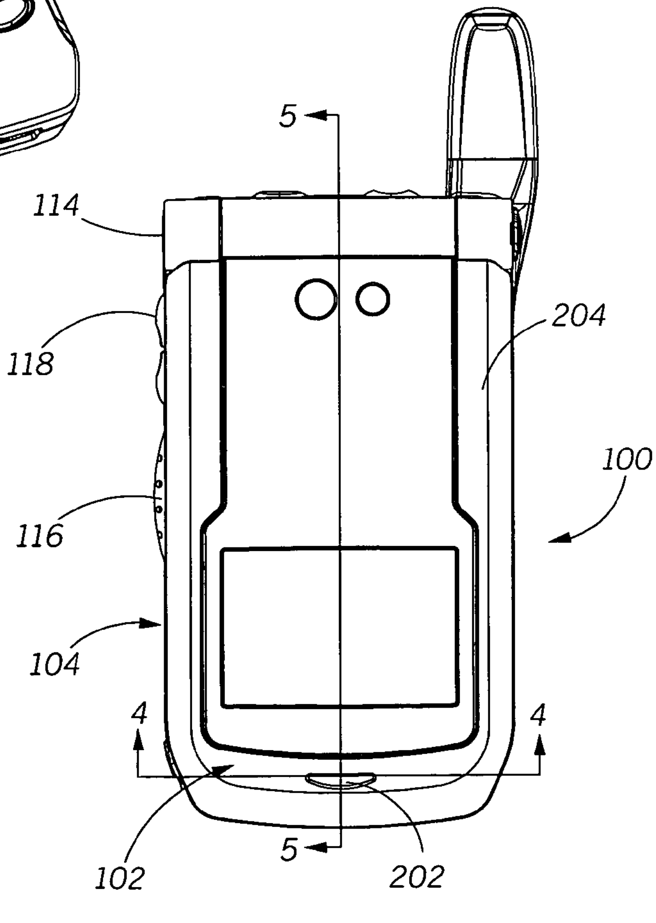
FIG. 2 illustrates the cellular flip-type phone of FIG. 1 in a closed position.

FIG. 2 illustrates the cellular flip-type phone 100 of FIG. 1 in the closed position. The closed cellular flip-type phone 100 has its flip part 102 rotated about hinge 114, relative to the open cellular flip-type phone discussed above, so as to lie along the top of the phone base 104 and to be in a first position. An outer flip part side 204 is illustrated in this view of the cellular flip-type phone 100. The outer flip part side 204 is the side of the flip part 102 that is opposite the front side 120 of the flip part 102, described above. The outer flip part side 204 includes an outer side acoustic port 202 that allows sound pressure signals from an acoustic transducer, which is internal to the flip part 102 in this exemplary embodiment and is discussed below, to be ported through the outer flip part side 204. Providing an acoustic port on the outer flip part side 204 is beneficial in smaller cellular phones that have a correspondingly smaller flip part 102 since the reduced internal spatial volume of the closed phone can adversely impact sound quality if such an acoustic port is not provided. Larger flip-type cellular phones are better able to adequately operate without an acoustic port on the outer flip part 204 side because they have larger internal spatial volume when closed. Incorporation of the outer side acoustic port 202 on the outer flip part side 204 advantageously provides improved acoustic performance when using a smaller flip part 102.

The closed cellular flip-type phone 100 further identifies two sectional views, a sectional view 4-4 and a sectional view 5-5, which are described in detail below.

Figure 3:
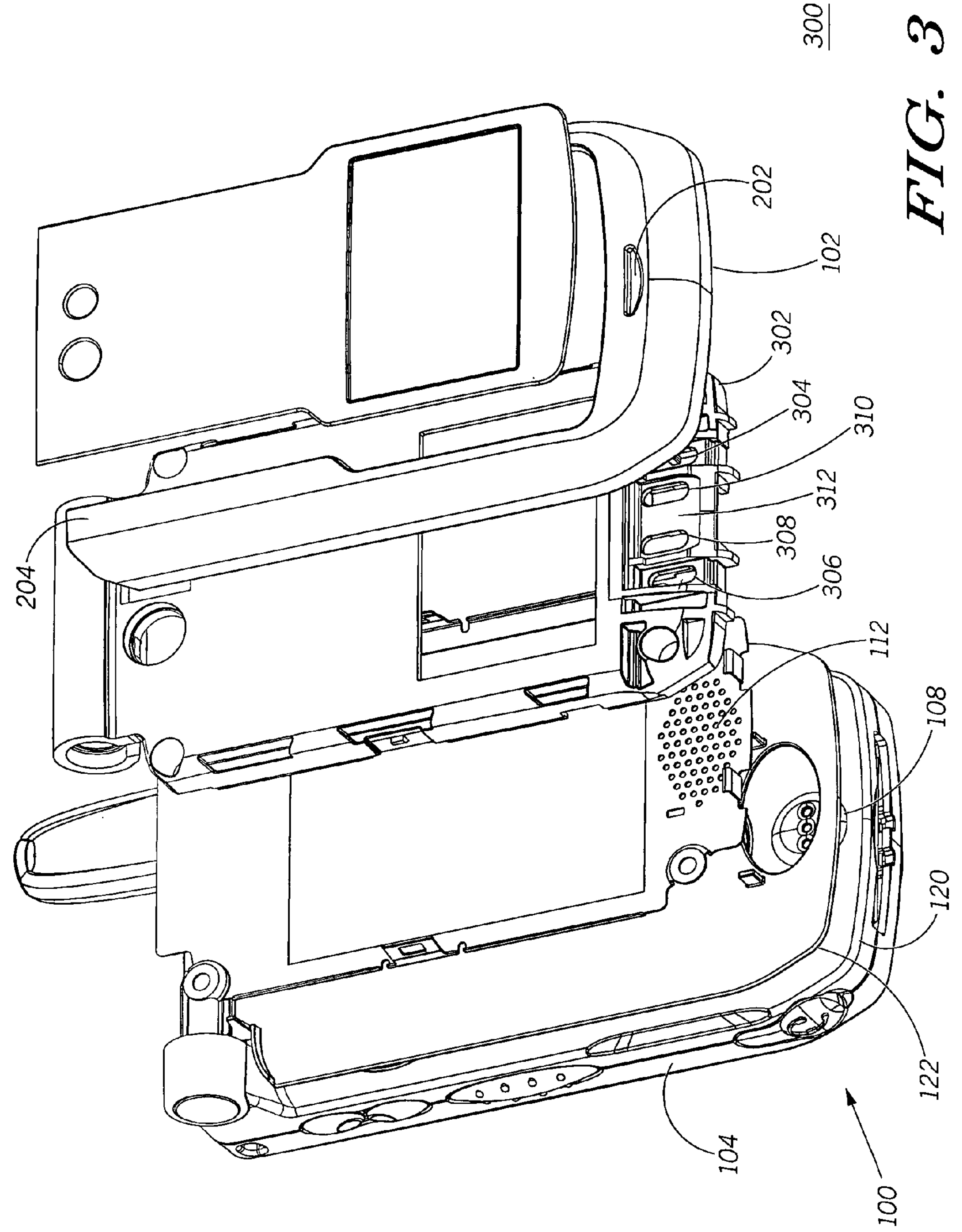
FIG. 3 illustrates an exploded view for part of the closed cellular flip-type phone of FIG. 2.

FIG. 3 illustrates an exploded view 300 for part of the closed cellular flip-type phone 100 of FIG. 2. The phone base 104, microphone protrusion 108 and the back of the flip front side 120 of the flip part 102 are shown for the cellular phone 100. A flip part inner support 302 is shown removed from the part supporting the front side 120 of the flip part 102. As shown, the flip part support 302 has a number of acoustic ports to support the operation of the acoustic system of the exemplary cellular phone 100. An acoustic transducer mounting area 312 accepts an acoustic transducer that is not shown in this illustration for clarity, but that is described below. The acoustic transducer mounting area 312 has a first acoustic transducer port 308 and a second acoustic transducer port 310 to pass sound pressure signals generated by a transducer placed in the acoustic transducer mounting area 312. Sound pressure signals generated by a mounted transducer pass through the first acoustic transducer port 308 and the second transducer port 310 and through the dual purpose acoustic port 112 when the flip part 102 is in the open, or second, position. Sound pressure signals generated by the mounted acoustic transducer also pass through outer side acoustic port 202.

The exploded view of FIG. 3 further illustrates the sound pressure signal path that is formed from the outer side acoustic port 202 to the microphone protrusion 108 when the flip part 102 is in its closed, or first, position. When the flip part 102 is in its closed position, sound pressure signals are able to enter the outer side acoustic port 202, pass through the first internal dual purpose acoustic port 304 and the second internal dual purpose acoustic port 306, and then pass on through the dual purpose acoustic port 112 and on through to the microphone protrusion 108. This arrangement provides a path from the outer side acoustic port 202 on the outer flip part side 204 to the microphone protrusion 108, thereby providing enhanced acoustic performance when the flip part 102 is in its closed, or first position. It can also be seen from this figure that microphone protrusion 108 protrudes into the recess formed by acoustic port 112 in this exemplary embodiment.

The acoustic path formed by the outer side acoustic port 202, the first internal dual purpose acoustic port 304 and the second internal dual purpose acoustic port 306, and the dual purpose acoustic port 112 is additionally used by sound pressure signals generated by an acoustic transducer when the flip part 102 is held relatively tightly to a users ear. With the configuration of the exemplary embodiment, the acoustic path through the dual use acoustic ports ensures a consistent acoustic performance for the user without regard to how the flip part 102 is held to the ear of the user. This characteristic advantageously provides a leak tolerant design by venting pressure. The "dual purpose" ports are given that name in this specification due to the use of these ports to conduct sound pressure signals that are generated by an acoustic transducer as well as to conduct sound pressure signals received from ambient sources, such as a user's voice, from the ambient area to the microphone protrusion 108.

FIG. 4 illustrates a closed cellular phone side cut away view 400 for the closed cellular phone 100 of FIG. 2. The side cut away view 400 corresponds to the sectional view through 4-4 of FIG. 2. The flip part 102 is shown to include the flip part inner support 302 with an acoustic transducer mounting area 312. An acoustic transducer 406, such as an electromagnetic speaker in the exemplary embodiment, is shown to be attached at the acoustic transducer mounting area 312, which is part of the flip part 102. In this exemplary embodiment, flip part 102 is a moveable component of the acoustic system of cellular phone 100. The front of the acoustic transducer 406 is shown to be facing and in proximity to the dual purpose acoustic port 112. The rear of the acoustic transducer 406 is mounted on the acoustic transducer mounting area 312 so that sound generated by the acoustic transducer 406 is ported through the first acoustic transducer port 308 (as illustrated in FIG. 3) and the second acoustic transducer port 310 (as illustrated in FIG. 3). The first acoustic transducer port 308 and the second acoustic transducer port 310 are not visible in the perspective of this figure, but are located in the flip part internal support 302, as shown above in FIG. 3. Sound pressure signals generated by the acoustic transducer 406 of the exemplary embodiment pass through the first acoustic transducer port 308 and the second acoustic transducer port 310 and are then ported through the outer side acoustic port 202. In this configuration, the outer side acoustic port 202 is an acoustic port configured to pass sound pressure signals generated by the acoustic transducer 406 through a first wall of the flip part 102, which is a moveable component of cell phone 100.

It is to be noted that the second internal dual purpose acoustic port 306, as well as the first internal dual purpose acoustic port 304 (which is behind the second internal dual purpose acoustic port 306 in the perspective of this figure but is not explicitly visible in this figure), form an acoustical path between the outer side acoustic port 202 and the dual purpose acoustic port 112. As is clear from this illustration, ambient sound pressure signals arriving and entering through outer side acoustic port 202 pass through the second internal dual purpose acoustic port 306 and first internal dual purpose acoustic port 304 and then through the dual purpose acoustic port 112 and are delivered directly to microphone protrusion 108.

The flip part 102 is shown to be folded closed along the phone base 104 so that the flip front side 120 is in proximity to the front of the phone base 104. The microphone protrusion 108 is shown to be protruding into the recess formed for the dual purpose acoustic port 112. This configuration forms a substantially closed acoustic pathway 404 between the dual purpose acoustic port 112, which is a dual purpose acoustic port in this exemplary embodiment, and the microphone protrusion 108. This substantially closed acoustic pathway 404 is also partially formed by the flip front side 120 in the exemplary embodiment.

Also illustrated in this side cut away view is a microphone cartridge 402, which is part of microphone protrusion 108 in this exemplary embodiment. A high output speaker 410 is also illustrated in this side cut away view. High output speaker 410 is used for various purposes within the cellular phone 100, such as for call notification ringing as well as for generating acoustic output when the cellular phone is operating in a high level audio mode, as described above, in either a simplex or duplex operational mode. In the exemplary embodiment, the acoustic transducer 406 does not operate when the flip part 102 of the cellular phone 100 is in its closed, or first, position, as is illustrated in this side cut away view. High output speaker 410 is instead used to generate audio output in this configuration.

Figure 5:
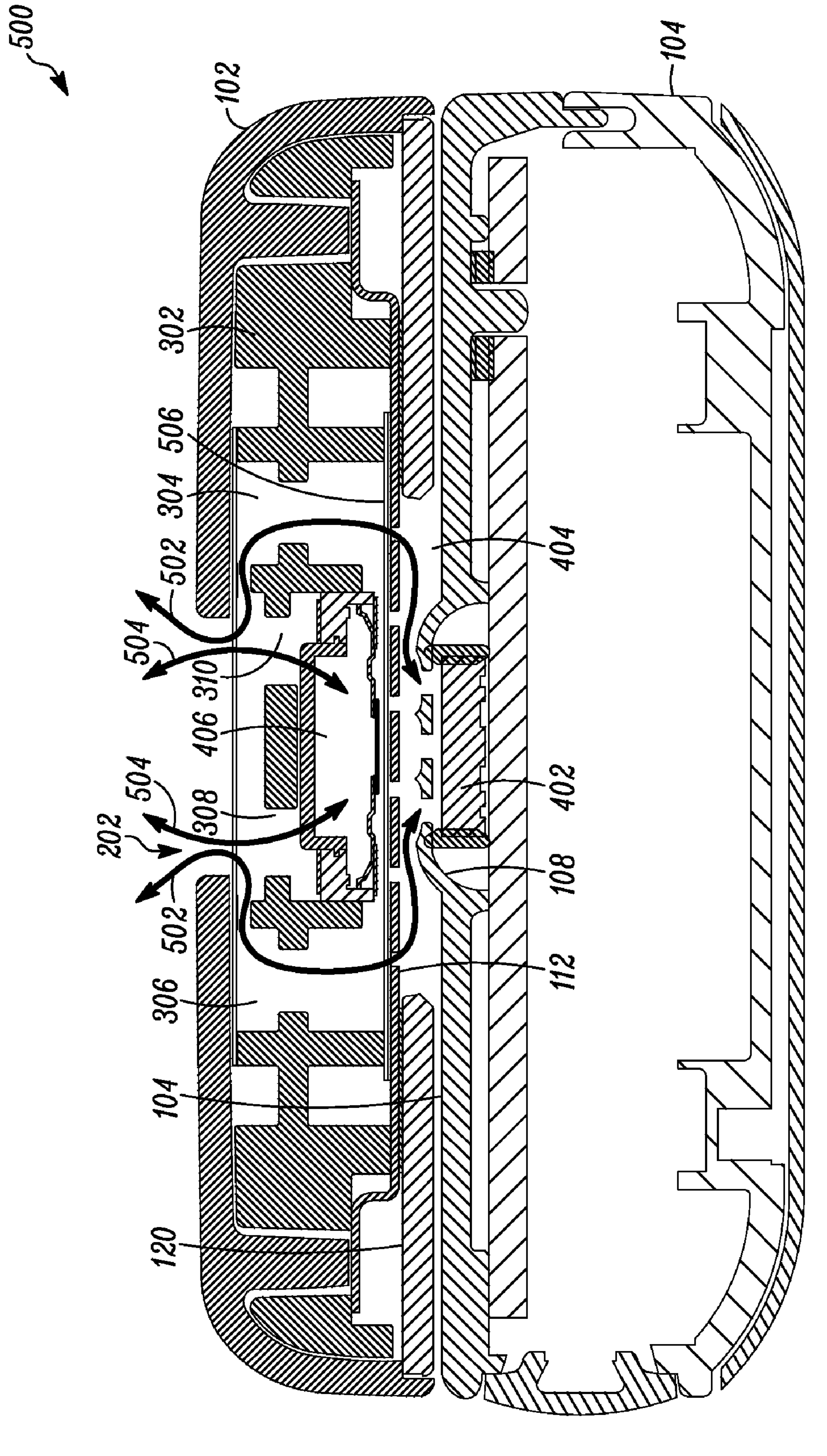
FIG. 5 illustrates a bottom cut away view for the closed cellular phone of FIG. 2.

FIG. 5 illustrates a bottom cut away view 500 for the cellular phone 100 of FIG. 2. The bottom cut away view 500 corresponds to the sectional view through line 5-5 of FIG. 2. The cut away view 500 illustrates the position of microphone cartridge 402 and the microphone protrusion 108 that are mounted in the phone base 104. The bottom cut away view 500 also illustrates the acoustic transducer 406, and the flip part internal support 302 that are located in the flip part 102.

The bottom cut away view 500 further illustrates a felt pad 506 that lines the back of the flip front side 120. Felt pad 506 is used in the exemplary embodiment in order to, for example, prevent foreign material from entering the phone housing. The felt pad 506 helps reduce the impact of metal shavings, which are attracted to the magnet within the acoustic transducer 406 and reduce the entry of water into the phone's case.

Microphone acoustic paths 502 are illustrated to show the path of sound pressure signals that enter the outer side acoustic port 202, propagate through the first acoustic transducer port 308 and the second acoustic transducer port 310, and continue on to reach the dual purpose acoustic port 112. These sound pressure signals then continue on through the substantially closed acoustic pathway 404 and arrive at microphone protrusion 108. These direct microphone acoustic paths 502 provide for enhanced acoustic performance of the microphone cartridge 402 when the flip part 102 of the flip-type phone 100 is in its closed position.

Speaker acoustic paths 504 are illustrated to show the path of sound pressure signals that propagate from the acoustic transducer 406, through the first acoustic transducer port 308 and the second acoustic transducer port 310, and through the outer side acoustic port 202. As noted above, the exemplary embodiment of the present invention does not operate the acoustic transducer 406 when the flip part is in a closed position, as illustrated in this bottom cut away view, but this acoustic path is shown in this figure for comparison to the microphone acoustic path 502. Although the microphone acoustic path 502 and the speaker acoustic path 504 are not identical, they do share a porting of acoustic signals through the outer side acoustic port 202.

Figure 6:
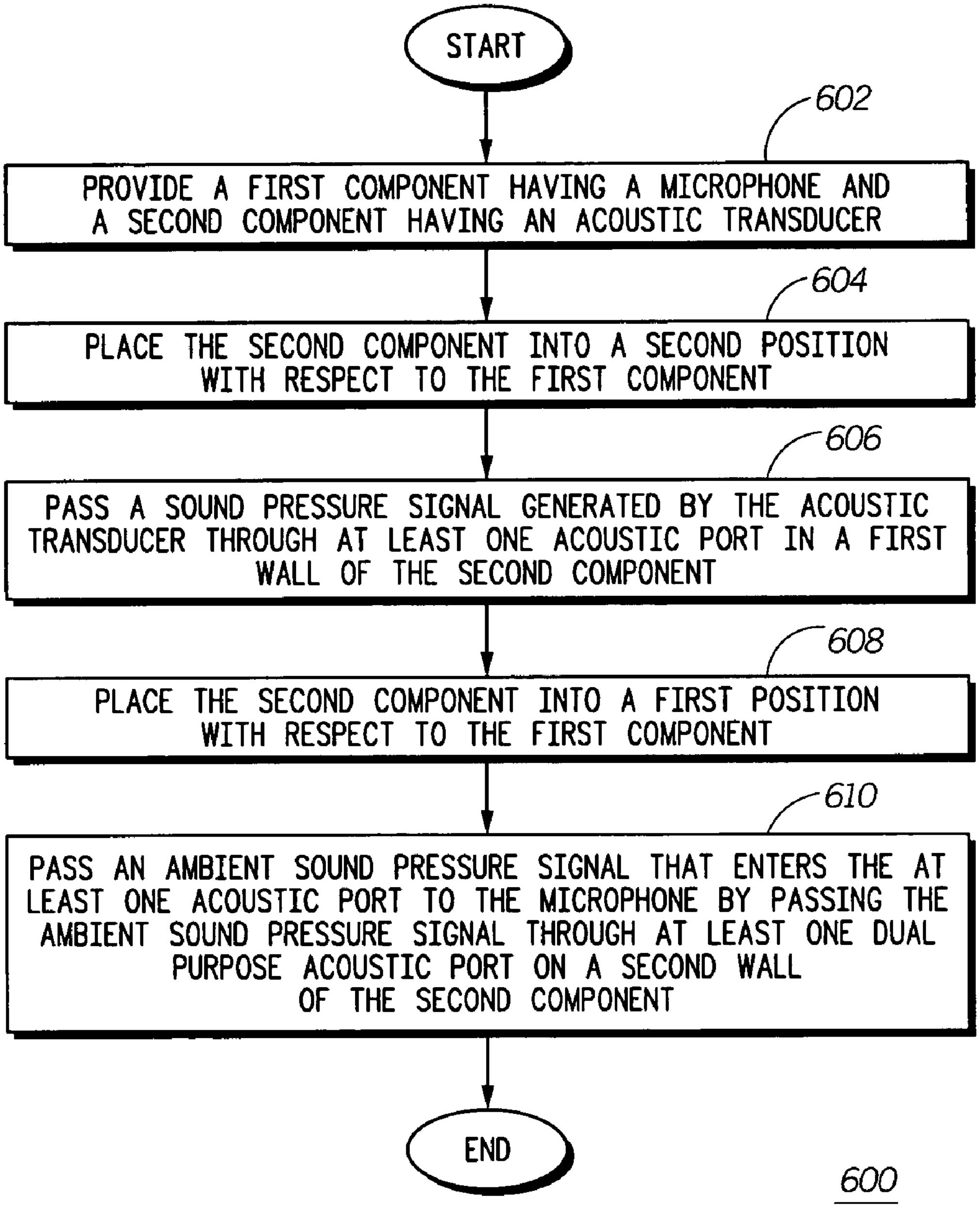
FIG. 6 illustrates a processing flow diagram for coupling a sound pressure signal according to an exemplary embodiment of the present invention.

FIG. 6 illustrates a processing flow diagram 600 for coupling a sound pressure signal according to an exemplary embodiment of the present invention. The coupling of a sound pressure signal begins by providing, at step 602, a first component having a microphone and a second component having an acoustic transducer. In the exemplary embodiment described above, the phone base 104 corresponds to the first component and the flip part 102 corresponds to the second component. The processing continues by placing, at step 604, the second component into a second position with respect to the first component. In the above described exemplary embodiment, the open position of the cell phone 100 corresponds to this second position. The processing then passes, at step 606, a sound pressure signal generated by the acoustic transducer 406 through at least one acoustic port in a first wall of the second component. In the above described exemplary embodiment, this step passes the sound pressure signal through at least the outer side acoustic port 202. The processing then places, at step 608, the second component into a first position with respect to the first component. In the above described exemplary embodiment, the closed position corresponds to this first position. The processing then passes, at step 610, an ambient sound pressure signal that enters the at least one acoustic port to the microphone protrusion 108 by passing the ambient sound pressure signal through at least one dual purpose acoustic port 112 on a second wall of the second component.

As is understood by those of ordinary skill in the relevant art, the operation of embodiments of the present invention are able to perform only a subset of the above described steps and are further able to perform these steps in a different order that described above.

Figure 7:
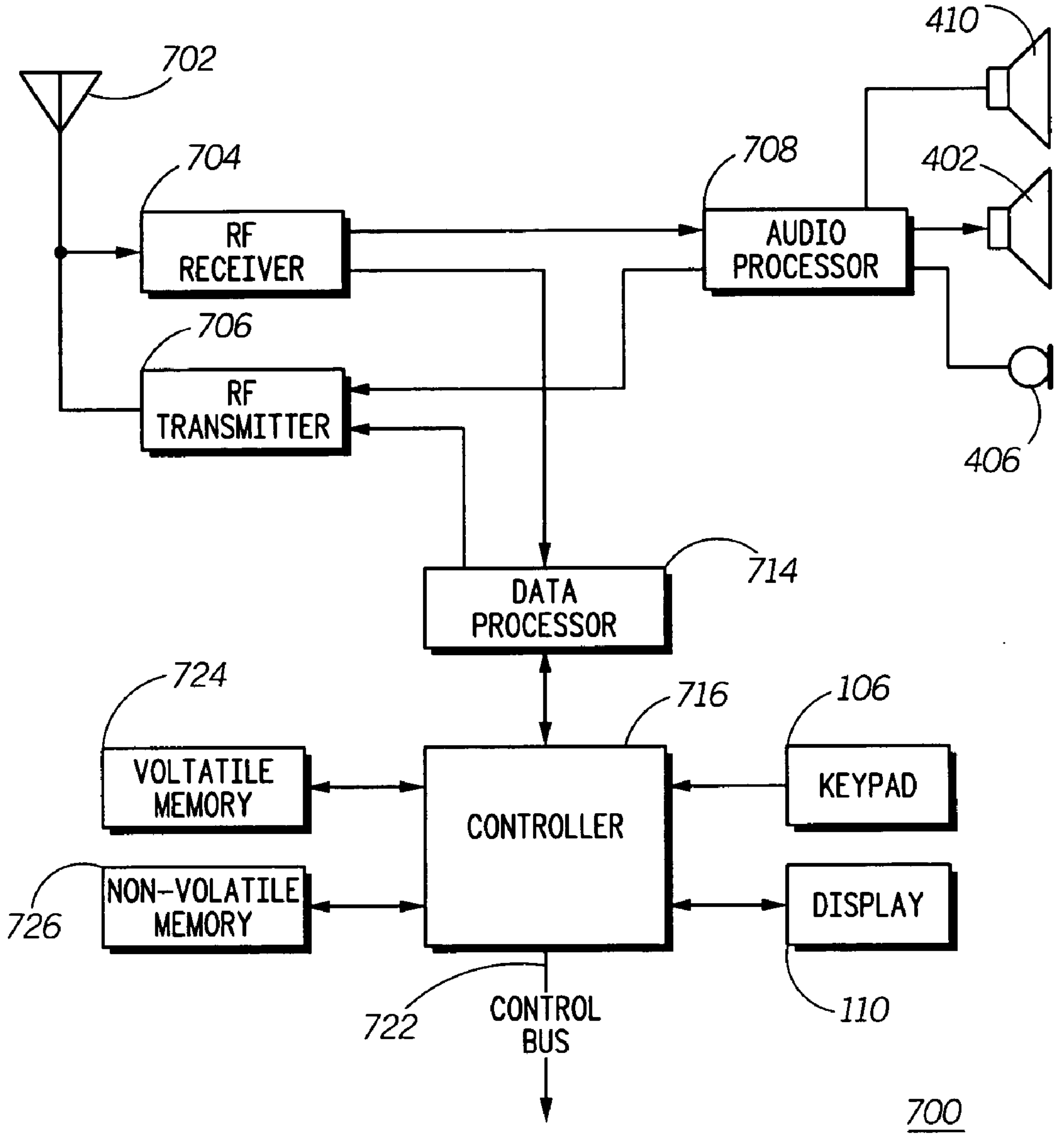
FIG. 7 illustrates a block diagram of a cellular phone incorporating an exemplary embodiment of the present invention.

FIG. 7 illustrates a block diagram of a cellular phone 700 incorporating an exemplary embodiment of the present invention. The cellular phone 700 includes an RF antenna 702, an RF receiver 704 and an RF transmitter 706. The RF transmitter 706 and RF receiver 704 are connected to the RF antenna 702 in order to support bi-directional RF communications. The cellular phone 700 is able to simultaneously transmit and receive voice and/or data signals. The RF receiver 704 provides voice data to an audio processor 708 and the audio processor 708 provides voice data to the RF transmitter 706 to implement voice communications. The audio processor 708 obtains voice signals from microphone cartridge 406 and generates audio signals that are provided to the acoustic transducer 402 or to the high output speaker 410, dependent upon the operational mode of the cellular phone. The RF receiver 704, RF transmitter 706, audio processor 708, microphone cartridge 406 and acoustic transducer 402 operate to communicate voice signals to and from the cellular phone 700.

The cellular phone 700 includes a controller 716 that controls the operation of the cellular phone in the exemplary embodiment. Controller 716 is connected to the various components of the cellular phone 700 via control bus 722. Controller 716 communicates data to external devices (not shown), such as a base station and/or a server, through a wireless link. Controller 716 provides data to and accepts data from data processor 714. Data processor 714 of the exemplary embodiment performs communications processing necessary to implement over-the-air data communications to and from external devices. Data processor 714 provides data for transmission to the RF transmitter 706 and accepts received data from the RF receiver 704.

Controller 716 provides visual display data to the user through display 110. Display 110 of the exemplary embodiment is a Liquid Crystal Display that is able to display alphanumeric and graphical data. Controller 716 also accepts user input from keypad 106. Keypad 106 is similar to a conventional cellular phone keypad and has buttons to accept user input in order to support operation of the cellular phone 700.

The cellular phone 700 further includes non-volatile memory 726. Non-volatile memory 726 stores program data and more persistent data for use by the controller 716. Data stored in non-volatile memory 726 of the exemplary embodiment can be changed under control of controller 716 if called for by particular processing performed by the controller 716. The cellular phone 700 further contains volatile memory 724. Volatile memory 724 is able to store transient data for use by processing and/or calculations performed by the controller 716.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. An acoustic system comprising:

a first component having a microphone;

a second component, moveable relative to the first component and able to be positioned in at least a first position and a second position relative to the first component, the second component having a first wall and a second wall, the second wall opposite the first wall; and at least one acoustic transducer affixed to the second component;

wherein the second component includes:

at least one acoustic port configured to pass a sound pressure signal generated by the acoustic transducer through a first wall of the second component; and at least one dual purpose acoustic port located on the second wall of the second component and configured to pass an ambient sound pressure signal that enters the at least one acoustic port to the microphone.

2. The acoustic system of claim 1, wherein the microphone is positioned relative to the at least one dual purpose acoustic port so as to receive the ambient sound pressure signal from the at least one dual purpose acoustic port when the second component is in the first position.

3. The acoustic system of claim 2, wherein the first component is a device base and the second component is a flip cover for the base.

4. The acoustic system of claim 2, wherein the at least one dual purpose acoustic port is located within a recess and the microphone protrudes into the recess when the second component is in the first position so as to form a substantially closed acoustic pathway between the at least one dual purpose acoustic port and the microphone.

5. The acoustic system of claim 2, wherein the microphone is located within a recess and the at least one dual purpose acoustic port protrudes into the recess when the second component is in the first position so as to form a substantially closed acoustic pathway between the at least one dual purpose acoustic port and the microphone.

6. The acoustic system of claim 1, wherein the at least one dual purpose acoustic port is located substantially opposite the at least one acoustic port.

7. The acoustic system of claim 2, wherein the acoustic transducer is not operating when the movable component is in the first position, and the acoustic system further comprising a speaker located remotely from the dual purpose acoustic port, the speaker operating when the movable component is in the first position.

8. A method for coupling a sound pressure signal, the method comprising:

providing a first component having a microphone;

providing a second component, wherein the first component and the second component are movable with respect to each other into at least a first position and a second position;

providing an acoustic transducer mounted on the second component, the acoustic transducer capable of producing a sound pressure signal;

providing at least one acoustic port configured to pass the sound pressure signal through a first wall of the second component; and passing an ambient sound pressure signal that enters the at least one acoustic port through at least one dual purpose acoustic port on a second wall of the second component to the microphone.

9. The method according to claim 8, wherein the microphone is positioned relative to the at least one dual purpose acoustic port so as to receive the ambient sound pressure signal from the at least one dual purpose acoustic port when the second component is in the first position.

10. The method according to claim 9, wherein the first component is a device base and the second component is a flip cover for the base.

11. The method according to claim 9, further comprising locating the at least one dual purpose acoustic port within a recess and wherein mounting the microphone comprising causing the microphone to protrude into the recess when the second component is in the first position, so as to form a substantially closed acoustic pathway between the at least one dual purpose acoustic port and the microphone.

12. The method according to claim 9, further comprising locating the at least one dual purpose acoustic port opposite the at least one acoustic port.

13. The method according to claim 9, further comprising not operating the acoustic transducer when the movable component is in the first position.

14. The method according to claim 13, further comprising operating a speaker located remotely from the dual purpose acoustic port when the movable component is in the first position.

15. A wireless phone comprising:

a phone base having a microphone;

a cover part able to be positioned in at least a first position and a second position relative to the phone base, the cover part having a first wall and a second wall that is opposite the first wall;

at least one acoustic transducer affixed to the cover part;

wherein the cover part includes:

at least one acoustic port configured to pass a sound pressure signal generated by the acoustic transducer through a first wall of the cover part; and at least one dual purpose acoustic port located on a second wall of the cover part and configured to pass an ambient sound pressure signal that enters the at least one acoustic port to the microphone;

a microphone configured to be positioned relative to the at least one dual purpose acoustic port so as to receive the ambient sound pressure signal from the at least one dual purpose acoustic port when the cover part is in the first position; and at least one an audio processor for receiving an audio signal from the microphone.

16. The wireless phone according to claim 15, further comprising an RF transmitter, communicatively coupled to the at least one audio processor, for transmitting an RF signal modulated with the audio signal.

17. The wireless phone according to claim 15, wherein the at least one audio processor produces digitized audio information.

* * * * *